G. T. WARWICK.
METAL WORKING MACHINE.
APPLICATION FILED FEB. 27, 1913.

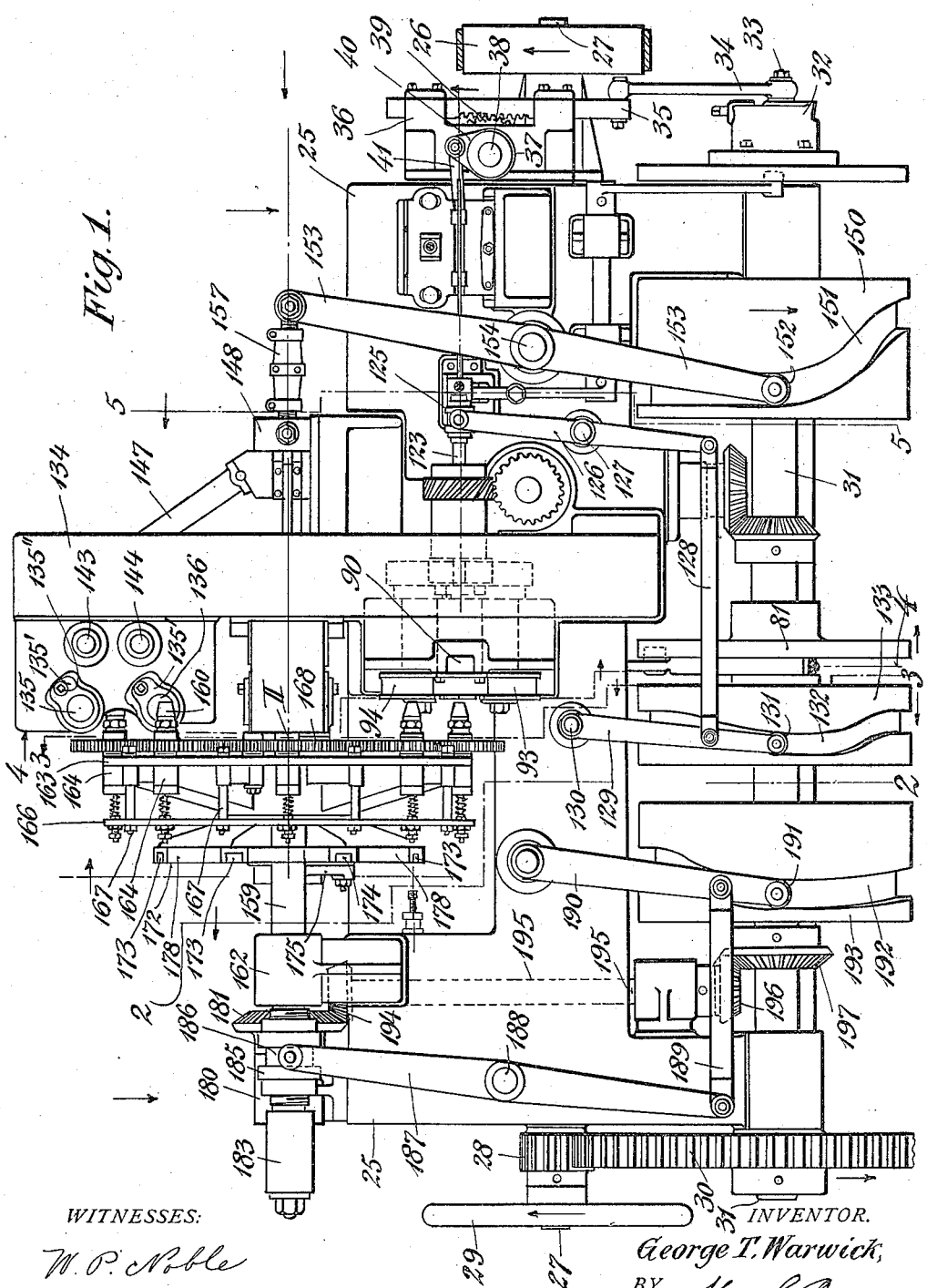

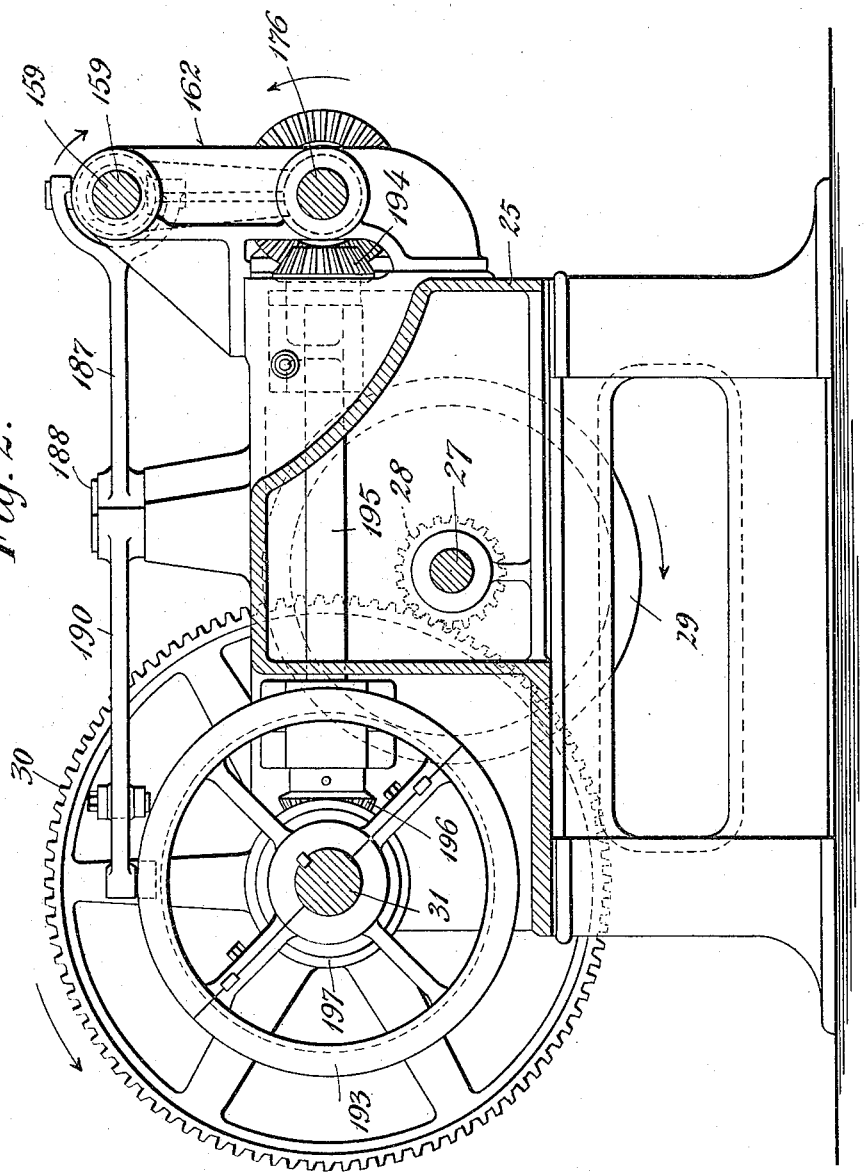

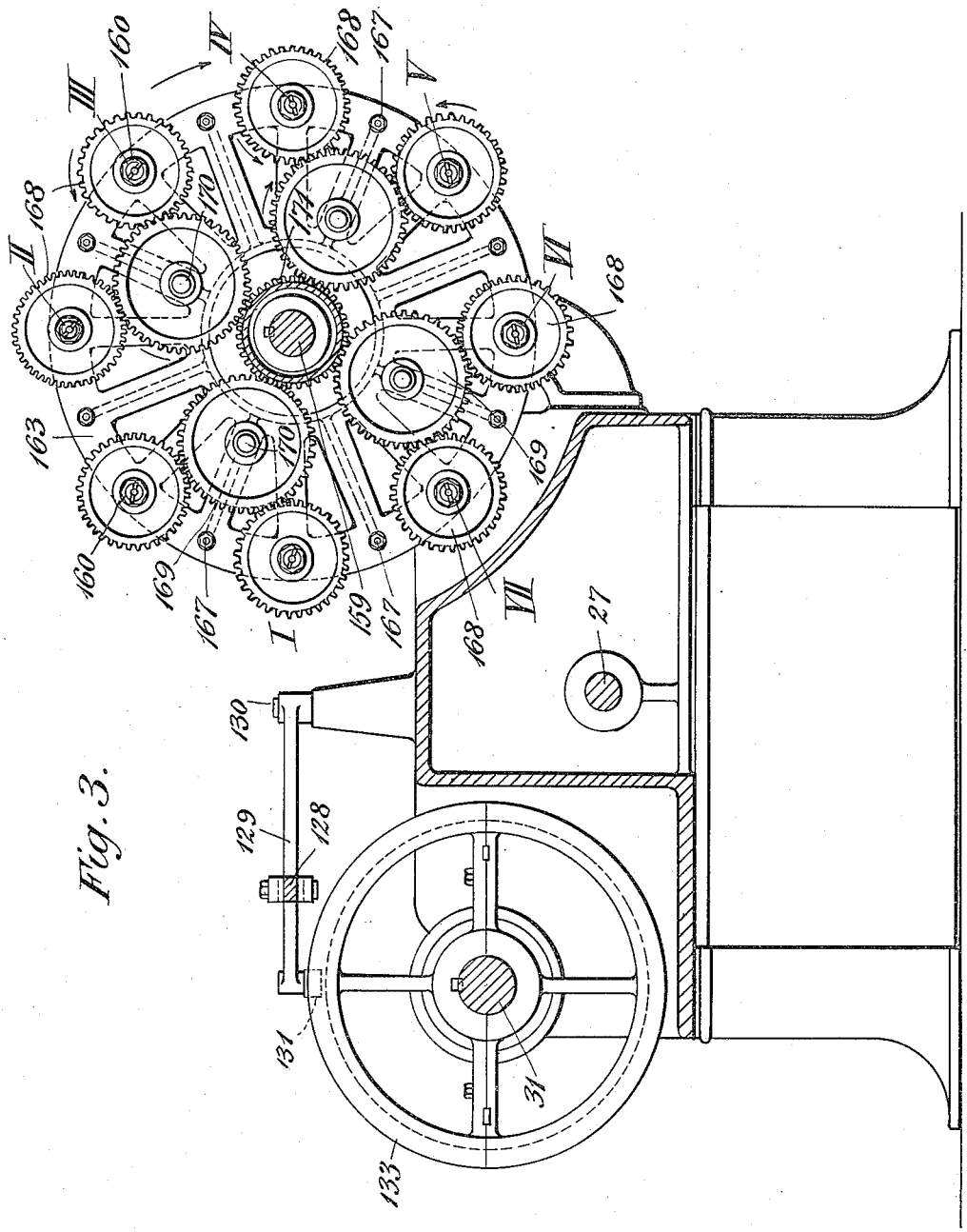

1,163,961.

Patented Dec. 14, 1915.
9 SHEETS—SHEET 4.

WITNESSES:
R. E. Slavan
H. L. Sprague

INVENTOR.
George T. Warwick,
BY
ATTORNEY.

G. T. WARWICK.
METAL WORKING MACHINE.
APPLICATION FILED FEB. 27, 1913.

1,163,961.

Patented Dec. 14, 1915.
9 SHEETS—SHEET 5.

WITNESSES:
W. P. Noble
H. L. Sprague

INVENTOR.
George T. Warwick,
BY
ATTORNEY.

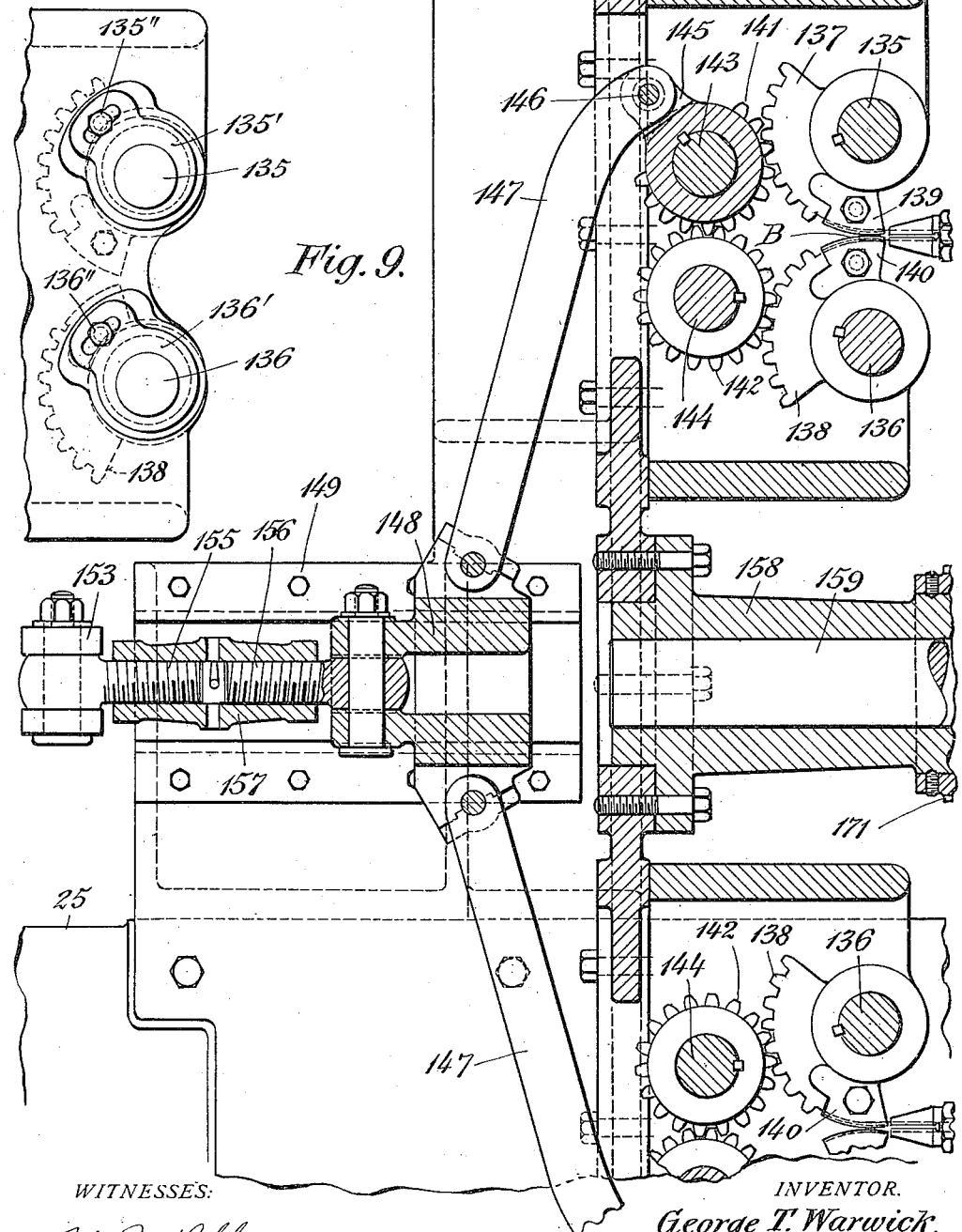

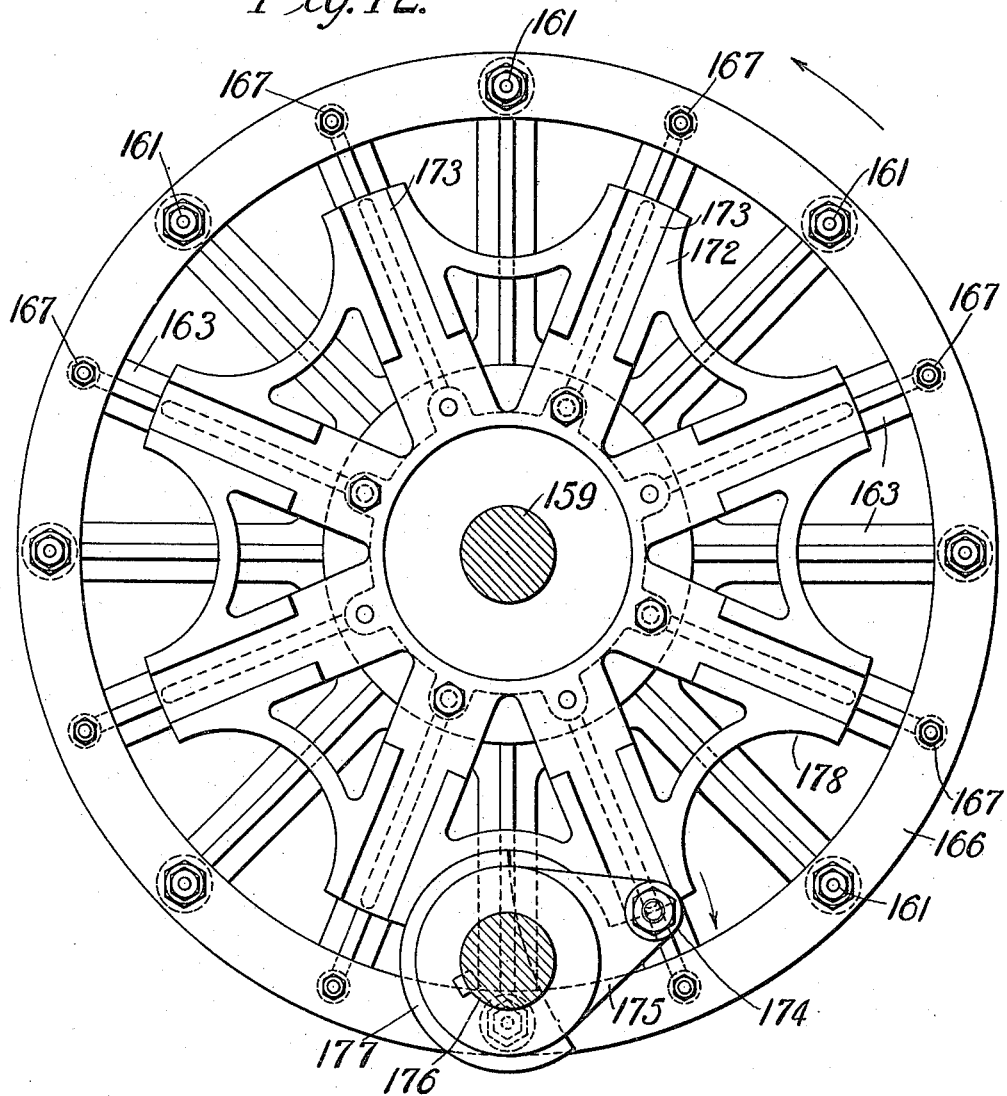

UNITED STATES PATENT OFFICE.

GEORGE T. WARWICK, OF SPRINGFIELD, MASSACHUSETTS, ASSIGNOR TO INTERNATIONAL MACHINE AND SCREW COMPANY, OF SPRINGFIELD, MASSACHUSETTS, A CORPORATION OF MAINE.

METAL-WORKING MACHINE.

1,163,961. Specification of Letters Patent. Patented Dec. 14, 1915.

Original application filed April 21, 1910, Serial No. 556,842. Divided and this application filed February 27, 1913. Serial No. 751,033.

*To all whom it may concern:*

Be it known that I, GEORGE T. WARWICK, a citizen of the United States of America, and resident of Springfield, in the county of Hampden and State of Massachusetts, have invented certain new and useful Improvements in Metal-Working Machines, of which the following is a full, clear, and exact description.

This invention relates to metal working machines, and more particularly to that class thereof which are employed for the purpose of forming blanks for screws, the blanks being cut from a roll of wire, the diameter of the latter being substantially equal to the head of the screws or blanks, the shank portions of which are reduced by compression of the stock through a series of successive operations.

The invention has for one of its objects, the provision of an improved machine of this character in which a number of blanks are operated upon at the same time, or in other words: a single machine in which the several successive steps or operations are simultaneously performed on a series of blanks.

The invention has, furthermore, for its object the provision in combination with the cutting-off and end-forming mechanism, of means whereby the blank may be reduced at the shank portion thereof in a gradual manner, so that little, if any, subsequent finishing or squaring-off is necessitated.

Further objects of the invention will hereinafter appear and the means of their attainment be particularly pointed out in the claims.

The invention has been clearly illustrated in the accompanying drawings in which similar characters denote similar parts, and in which—

Figure 11:
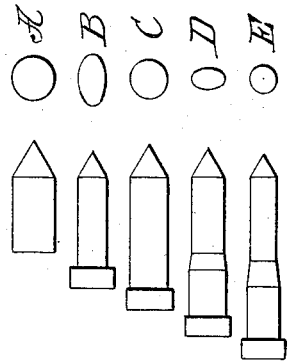
Figure 4:
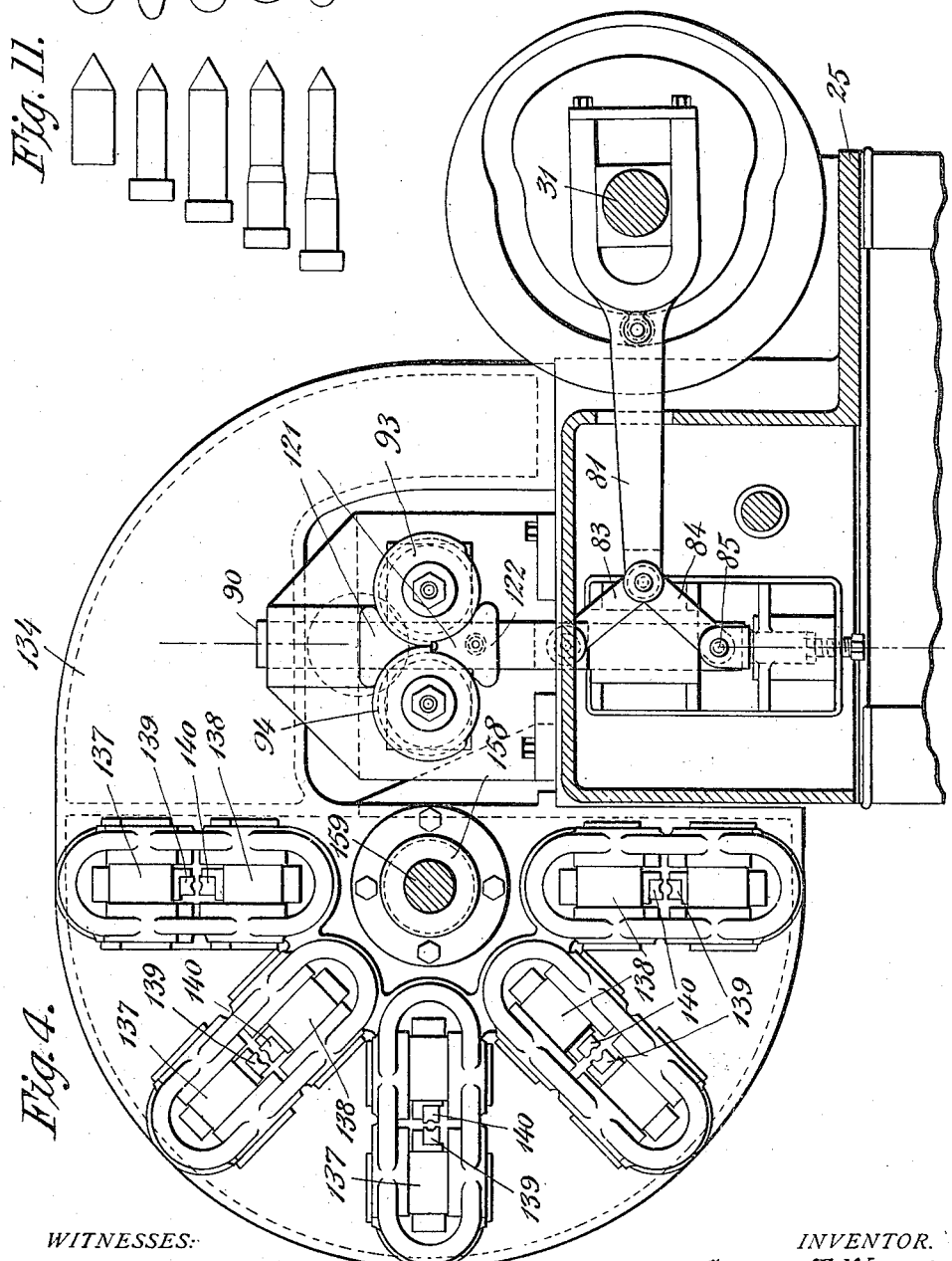
Figure 5:
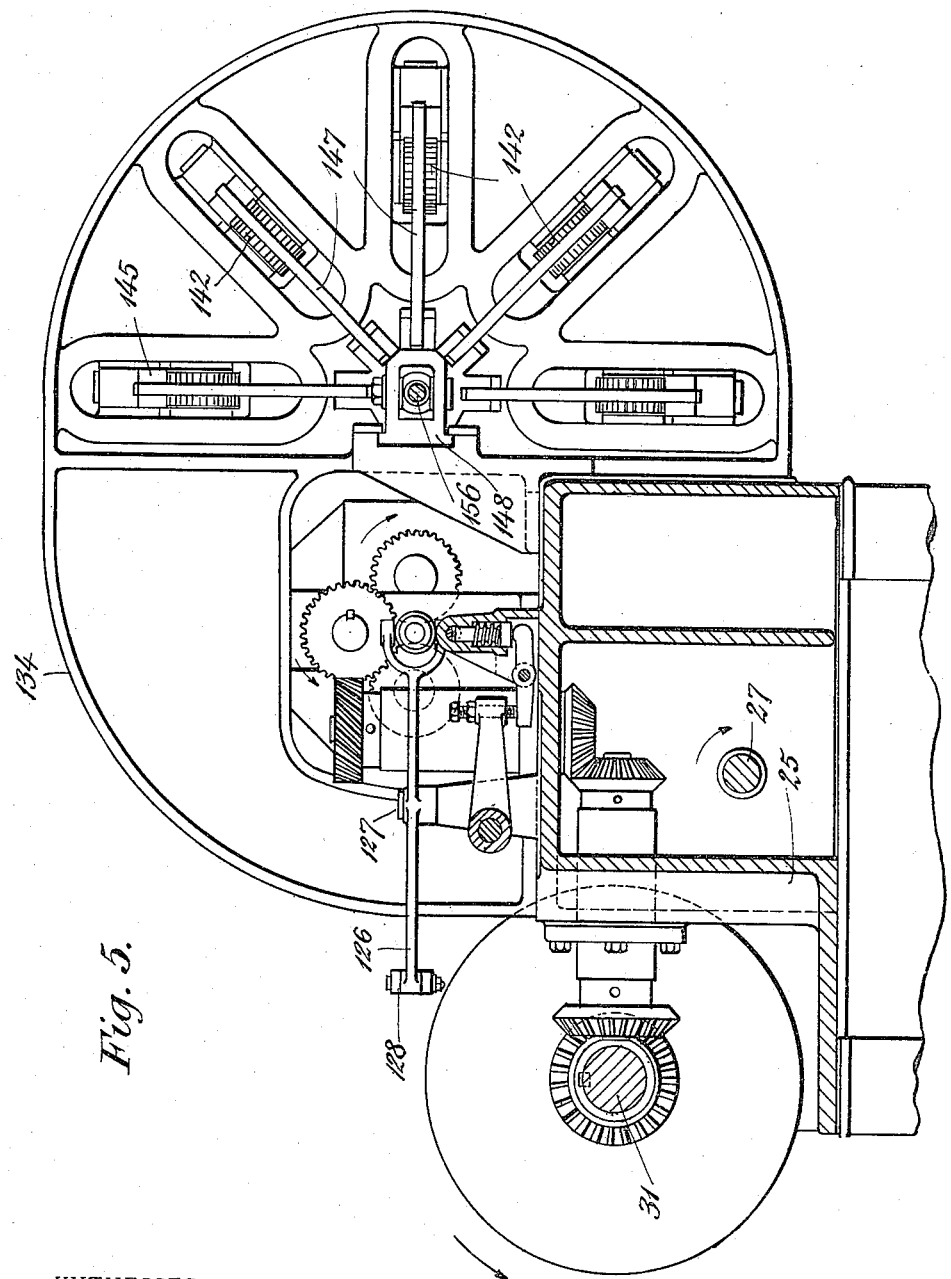
Figure 6:
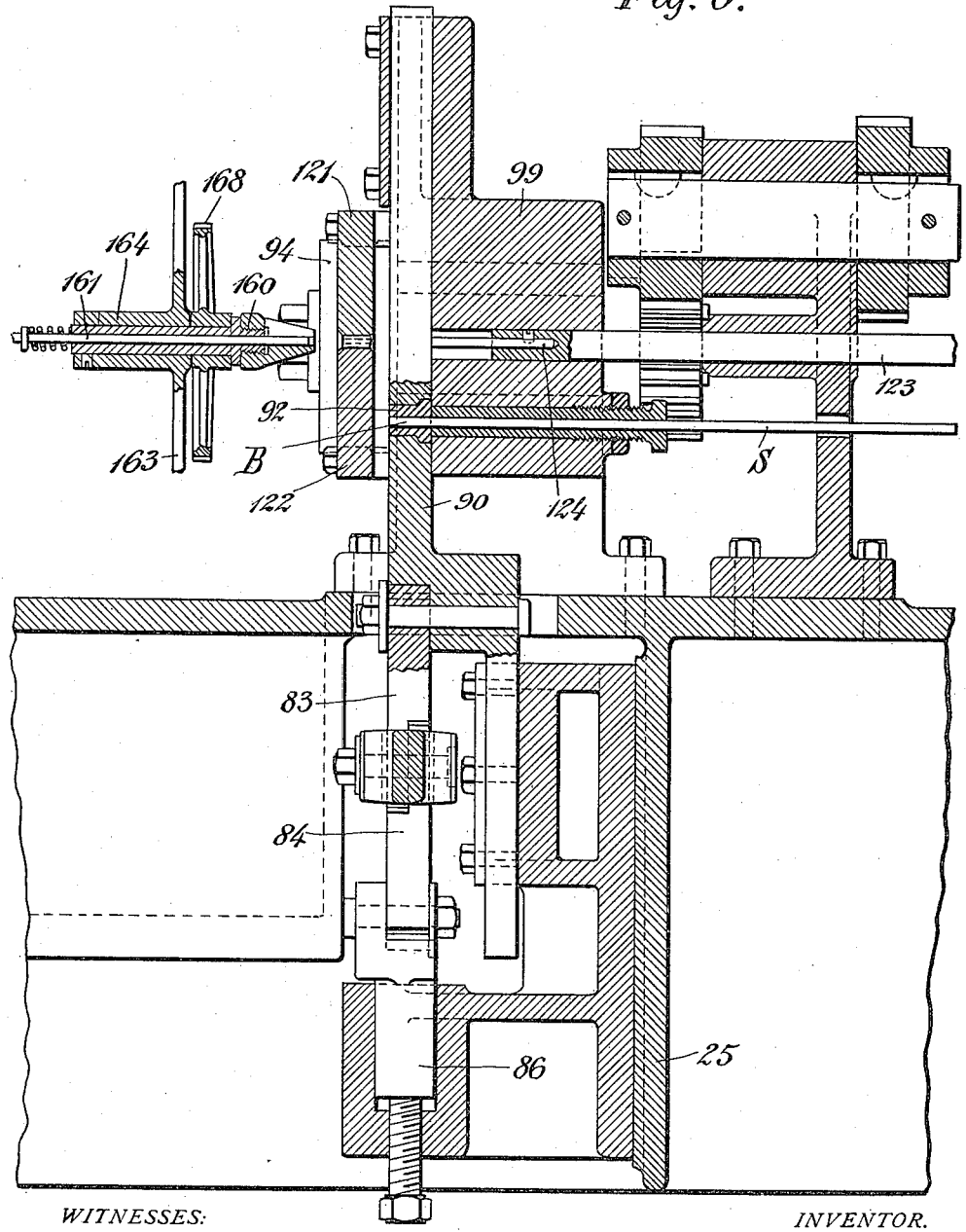
Figure 7:
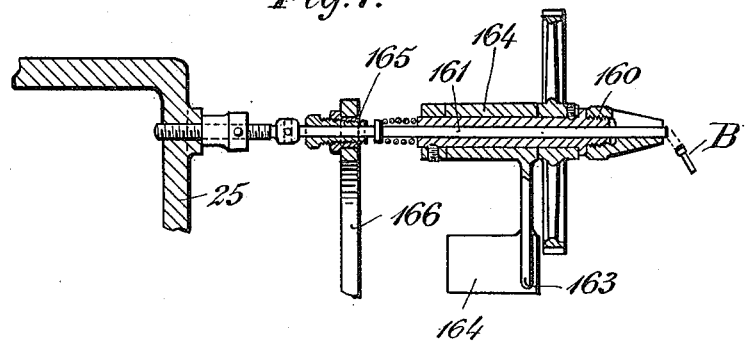
Figure 8:
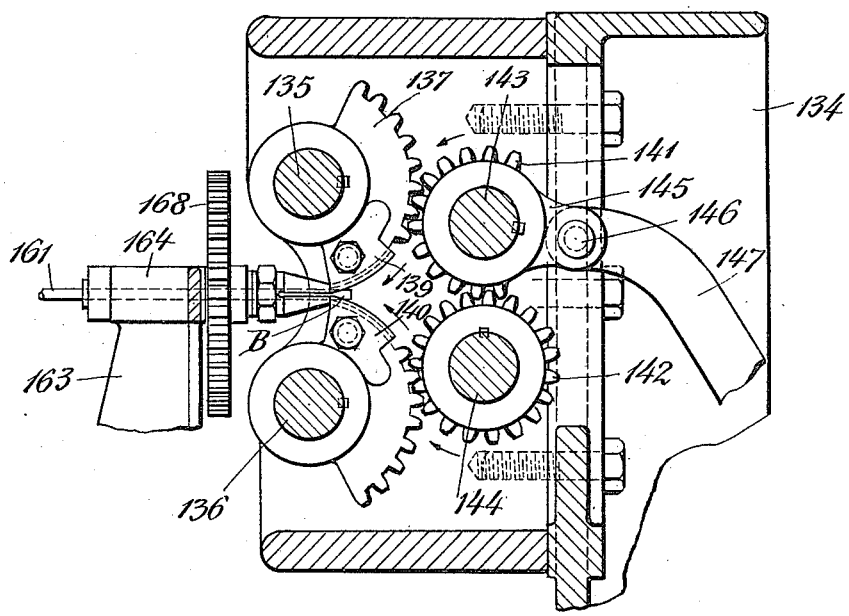

Figure 1 is a plan or top view of a machine embodying my invention. Fig. 2 is a vertical cross section on line 2, 2 indicated in Fig. 1 and looking toward the left of said figure. Fig. 3 is a similar section on line 3, 3 of Fig. 1 looking in the same direction as Fig. 2. Fig. 4 is a similar section on line 4, 4 (substantially the same as 5, 5) but looking toward the pulley end of the machine or toward the right of Fig. 1. Fig. 5 is a vertical section on line 5, 5 of Fig. 1 looking toward the left of said figure. Fig. 6 is a vertical cross section of the stock-feeding means and also the device whereby the stock is held against retrograde movement during the return stroke of the feeding-in means. Fig. 7 is a longitudinal section through the blank-carrying chuck and the mechanism whereby the blank is ejected in substantially finished condition. Fig. 8 illustrates in detail one set of the coöperative dies whereby the shank portion of the blank is reduced. Fig. 9 is a central section of the device which carries the shank-reducing mechanism. Fig. 10 illustrates the means whereby the reducing rolls may be adjusted relatively to each other so as to produce shanks of different diameters. Fig. 11 shows in side elevation and end view, the blank in its successive stages of engagement by the dies.

Referring at first to the general construction or assemblage of the machine, as a whole, (see Fig. 1), the numeral 25 denotes a bed-plate on which the several elements are mounted. The driving-pulley 26 is disposed on the right hand end of the machine, and power may be imparted thereto from any convenient source. The pulley 26 is mounted on and rotates the shaft 27 which extends from end to end of the bed 25, and carries at its other end a pinion 28 and also a hand-wheel 29 whereby the shaft 27 may be manually rotated when required. The pinion 28 is in engagement with a gear 30 secured upon the main cam-shaft 31 which constitutes the controlling and timing element for operating the several mechanisms and devices of which the machine is composed.

At the right hand end of the bed 25 is disposed the feeding-in mechanism for the stock which is driven from the cam-shaft 31 by means of a crank-disk 32 carrying a crank-pin 33 connected by a pitman-rod 34 with a rack-bar 35 which is guided for reciprocatory movement in a bracket 36 secured to the end of a bed-plate 25, and which is also provided with bearings 37 in which a shaft 38 is rotatably mounted. Secured to this shaft, is a gear 39 which is in constant engagement with the teeth of the rack-bar 35 so that when a reciprocatory movement is imparted to said rack-bar, an oscillatory movement will be imparted to the gear 39 and consequently to the shaft 38. Secured to the upper end of the shaft 38 is a crank 40 connected by a pitman-rod 41 with the slide on which the stock-grippers or feeders are mounted.

After passing the feeding mechanism, the elements of which may be of any desired construction, the stock or wire passes through a device whereby any return movement of the stock during the retrograde movement of the feed-slide will be prevented; but inasmuch as the present invention does not deal with this feature of the machine, detailed description of the same is dispensed with, the present mechanism being also fully shown and described in a contemporaneously-pending application, S. N. 556,842, to which reference may be had. The next step which takes place after the stock has been fed forward, is that of cutting-off from the stock a length corresponding to the blank to be formed, the cutting-off mechanism being also of any desired construction, and comprising a pair of toggle levers 83, 84, (see Fig. 4) the latter of which is pivoted at 85. The upper end of the toggle-arm 83 (see Fig. 6) is articulated to the cutter-slide 90 to cut from the stock S a blank B and subsequently raise the same into position opposite a device whereby the blank is pushed out of the slide into position between a pair of rollers 93, 94 whereby the substantially square ends of the blank B will be burred and rolled into rounded form when the blanks are to be made into "machine" screws or into tapered or pointed form when the blanks are to be made into "wood" screws,—interchangeable rolls, of course, being employed.

Means are provided whereby each blank, as it is entered between the burring-rollers, is supported in its position to be engaged and rolled by the latter. These means consist of a pair of guard-plates 121, 122, disposed above and below the line of rolling contact between said burring-rollers (see Figs. 4 and 6), these guard-plates being attached to a standard 99 and having their adjacent ends shaped so as to properly inclose the blank at points vertically diametrically to each other.

The mechanism whereby each blank after it has been cut off from the stock is transformed from the cutter-slide to its points of rest between the burring-rollers, or more particularly speaking, between the guard-plates 121, 122 is clearly illustrated in Figs. 1, 5 and 6.

Referring first to Fig. 6, it will be seen that the cutter-slide 90 is in its lowermost position, so that when the cutter-cam is operated, the blank will be transferred by the cutter-slide into alinement with the opening between guard-plates 121, 122, and also in alinement with an ejector device shown herein as a push-rod 123, the forward end of which is provided with a pusher-pin 124 of such size as to readily pass between the guard-plates 121, 122. The other end of the ejector-rod 123 carries a grooved-spool 125 which is engaged by the bifurcated end of an actuating-lever 126 which is fulcrumed at 127 on a standard projecting upward from the bed 25, and the other end of which is connected by a link 128 with a cam-lever 129, which latter is pivoted at 130 on the bed-plate 25 and carries at its forward end a roller 131 traveling within a groove 132 of the ejector-cam 133 which is secured to the main cam-shaft 31. It may be stated here that both burring-rollers are so constructed that at the proper time the blank may not only be injected from one side of said burring-rollers, but, furthermore, that said blanks may be ejected therefrom at the proper time and into devices whereby further action on the blank as to the swaging of the shank may take place. Hence, it will be understood that the injector-rod 123 has in reality two functions: first, to inject the blank from the cutter-slide into position between the burring-rollers, and to eject the rolled blank from the burring-rollers into one of a number of chucks which pass in front of said burring-rollers and whereby successive blanks are taken from said rollers and transferred to a series of progressively-operative swaging-devices whereby the shank of the blank is properly reduced.

Referring now to Figs. 4 and 5 which represent vertical sections through the machine at substantially the same line, but looking in opposite directions, it will be noted that a housing 134 is secured to the top of the bed, which housing contains a series of consecutively operative devices whereby the shank portion of each blank is progressively reduced in diameter, and which are concentrically disposed around a common center and, for purposes of easy and simultaneous manipulation, are radial relatively to this center so that the means whereby said devices are actuated may all be controlled by one member which is common to all of them. Furthermore, by virtue of a transfer mechanism to be hereinafter described and whereby the blank is brought into connection with the swaging-devices, the latter are placed equidistantly apart in the manner shown. In the present instance five of these swaging or reducing devices are illustrated, the first one of which brings the shank of the blank into the shape illustrated by A (see Fig. 11); the second one rounds the blank again into shape as shown at B; the third device renders the shank elliptical in cross section as shown at C; the fourth brings it again into rounded form, and the fifth reduces the shank to its finished size by very slight compression on the shank shown at D.

The operation of the swaging-devices has been clearly shown in Figs. 8 and 9, of which Fig. 8 represents the swaging-device ready to start, and Fig. 9 illustrates the same in position after it has completed its work. It should be remembered that the several swaging-devices above referred to are substantially the same in general construction and operation, the only difference between them being the shape of the swaging tools or dies which are made so as to correspond to the different shapes of the shank required by the several operations, respectively.

Referring first to Fig. 9 in which the general organization and actuating mechanism of the devices in conjunction therewith is shown, the numerals 135, 136 denote a pair of short shafts journaled in suitable stationary bearings on the housing 134. Keyed, or otherwise rigidly secured to these shafts, are a pair of gear segments 137, 138 which are free from each other and carry swaging-dies 139, 140, respectively, which as has been stated above, are shaped with their adjacent surfaces to shape or reduce the shank portion of the blank in the proper manner. The gear segments 137, 138 are in engagement with pinions 141, 142, respectively, the latter being secured on spindles 143, 144 also journaled within the housing 134, the gears 141, 142, however, being in mesh, so that when one of said pinions is operated, the other one will also be rotated but in a reversed direction.

The body of the pinion 141 has an extension 145 to which is articulated, as at 146, a link 147 which connects the arm 145 with a slide 148 mounted for horizontal movement on an extension 149 secured to, or forming a part of, the housing 134. It will, therefore, be seen that by moving the slide 148 toward the right and into position shown in Fig. 9, the pinions 141, 142 will be rotated from the position shown in Fig. 8 to that shown in Fig. 9 and consequently, the swaging-dies 137, 138 will also have been rotated to compress or swage the shank of the blank between them, at the same time moving the latter longitudinally with its holding device.

Means are provided for properly and timely actuating the slide 148, these means consisting substantially of a swaging-cam 150 (see Fig. 1) secured to the main camshaft 31 and having a groove 151 to receive a cam-roller 152 which is pivoted on the end of a lever 153. This lever is fulcrumed on a stud 154 secured to the bed 25 of the machine, and its other end is connected with the slide 148, by means of a link consisting in its preferred form of a pair of butt-ends 155, 156 which are screw-threaded right and left hand, and connected by a turn-buckle 157 to obtain a fine adjustment as to the movement of the slide 148 and its resultant rotation of the pinions 141, 142.

Means are provided whereby the distance between the rolling axes of the swaging-dies may be varied so as to accommodate blanks of different diameters and also to precisionize the size of the blank-shanks, these means being illustrated in detail in Fig. 10 in which it will be noted that the ends of the spindles 135, 136 are journaled in eccentric bushings 135', 136' provided with slotted flange-portions through which clamping-bolts 135'', 136'' may pass to hold said bushings rigidly in their adjusted positions. By virtue of this adjustment, it will also be noted that the swaging-dies may be located so as to come into exact central alinement with the blank-carrying chucks on the carrier, or that, in other words:—the blank in the chuck will come into position with its axis exactly half way between the adjacent moving faces of said dies.

Disposed concentrically with the several swaging-devices, and journaled in a bearing (see Fig. 9) which is secured to the housing 134, is a shaft 159 which constitutes the medium whereby the several blank-receiving chucks are carried into coöperation with the several swaging-devices, these chucks being mounted upon a carrier or spider which constitutes a transfer device for the blanks, and which is movable longitudinally of its axis to permit movement of the blanks with the swaging dies during the rotative movements thereof, and which is taken advantage of also to eject the finished blank from its chuck or holder at a particular point of its travel around the axis of the shaft 159.

The construction of the blank-receiving chucks and their supporting spider or carrier is clearly illustrated in Figs. 1, 3, and 7. Referring at first to Fig. 3, it will be seen that the present chuck-carrier supports eight chucks 160 which are preferably of the spring-pressed variety (see Fig. 7) and have a longitudinal rod 161 extending therethrough to serve not only as a medium against which the inner end, or more particularly the head portion thereof, will abut so as to leave the shank-portion of the blank projecting for the required distance beyond the end of the chuck, but will also act as a means whereby the finished blank will be ejected therefrom at the proper time. Again referring to Fig. 3, the station where blanks are entered into the successively arriving chucks is indicated by numeral I. The first swaging or reducing operation takes place at station II. The next swaging or rounding operation takes place at station III. The next swaging or flattening operation takes place at station IV. The final rounding of the shank takes place at station V, and the finishing operation takes place at station VI. The blank is discharged or ejected from its chuck at station VII, it being understood that every time any particular chuck arrives at any one of the stations just enumerated, the carrier stops long enough in its rotation to permit proper action of the swaging-devices, or the injecting mechanism, or the ejecting mechanism. From the foregoing, it will be understood that the rotative movement of the carrier is really intermittent, and I accomplish this result by a star-wheel-and-crank mechanism such as is clearly shown in Fig. 2.

The shaft 159 is, as above stated, journaled in a bearing 158, and it is also supported in a bearing 162 secured to the bed 25 and in which bearings, the shaft 159 is not only rotatable but also movable longitudinally for purposes hereinafter set forth.

The carrier or transfer mechanism comprises as one of its elements a spider 163 which is rigidly secured to the shaft 159 and which is provided with a series of bearings 164 within which the blank-receiving chucks 160 are rotatably held, while the rods 161 thereof project rearwardly into bushings 165 which are adjustably supported in a ring or annulus 166 which is properly distanced and positioned relatively to the spider 163, as for instance by the spacer-bolts 167. It will, therefore, be understood that when the shaft 159 is moved longitudinally in its bearings, said carrier or spider 163, together with the annulus 166, will be moved therewith. Now, the organization of the chucks, as far as their rotation is concerned, is such that as each chuck travels from one station to the next one, the chuck is rotated 90 degrees, so that when the swaging-devices operate on the shank of the blank in the chuck, the results illustrated in connection with Fig. 11 will be obtained. The mechanism for imparting these "quarter turns" to the chucks is clearly shown in Fig. 3, in which it is seen that each chuck has a gear 168, the adjacent pairs of which are in engagement with intermediates 169 journaled on studs 170 which are rigidly held in the spider 163, and said intermediates 169 are in constant engagement with a preferably stationary pinion 171 secured upon the bearing 158 (see Fig. 9) above mentioned. This means that when the spider 163 is rotated on the shaft 159 the gears 168 will be revolved around the axis of this shaft, and at the same time they will rotate on their own axes 90 degrees from station to station.

As above stated, the rotative movement of the shaft 159 is intermittent as caused by a star-wheel 172 having a series of radial grooves 173 adapted to be successively engaged by a roller 174 carried on the free end of a crank-arm 175 which is rigidly secured on a shaft 176, and the hub of which is properly shaped to engage recesses 178 disposed between the actuating grooves 173 and serving as a means for locking the star-wheel against movement when the crank-pin roller 174 is out of engagement therewith. The shaft 176 is journaled in a bearing formed on the bracket which supports the bearing 162, and it also finds a support in another bearing 180 secured to the bed-plate 25. Interposed between these bearings, and held against longitudinal movement with the shaft 176, is a bevel-gear 181 which has a key-connection with said shaft to permit the latter to slide through the same at the time when the shaft 159 is shifted longitudinally, both shafts being connected by an arm 183 in the manner shown. In Fig. 1 the shaft, together with the carrier and other component elements, is illustrated in its extreme forward position. The purpose of this shifting movement is to move the chucks with the blanks contained therein to correspond to the action of the swaging-devices, and also to maintain the intermediate driving mechanism in proper correlation to the spider, as well as to effect the proper operation of the ejecting mechanism which latter comprises in the present instance a stationary member (see Fig. 7) in screw-threaded engagement with a part of the bed 25, so that proper adjustment may be had thereof, and it will actuate the ejector-rods 161 as illustrated in that figure to eject the blank at station VII, the bed 25 being cut away at this place in the manner shown in Figs. 2 and 3.

The means for shifting the shafts 159 and 176 consists substantially of a spool 185 having a groove 186 engaged by the forked end of a lever 187, said spool being preferably screw-threaded on the shaft 159 to permit the proper positioning thereof, so as to move the shaft 159 and the chucks carried thereby into proper position. The lever 187 (see Fig. 1) is fulcrumed at 188 on the bed 25 and its end is connected by a link 189 with a cam-lever 190 which carries at its forward end a roll 191 riding in a cam-groove 192 provided in the shifter cam 193 which is secured to the cam-shaft 31, above described.

The shaft 176 is continuously rotated through the gear 181, above mentioned, which is in engagement with a bevel-pinion 194 secured at the end of a transverse shaft 195 (see Figs. 1 and 2) which carries at its forward end a pinion 196 driven by a gear 197 on the shaft 31.

The operation of my improved machine is as follows:—A wire corresponding in diameter to the head of the screw blank to be formed, is threaded into the machine from the right hand of Fig. 1 by passing the same between the grippers carried on the jaws of the feed-slide and thence to the stock-holding device, thence through the standard on which the cutter-slide is movably supported. When this slide is in its lowermost position, the stock may be entered into the slide for the required amount by the feeding mechanism, whereupon the slide is moved vertically to bring the cut-off blank into alinement with the space between the guard plates 121, 122. The injector-rod 123 then advances with the pusher-pin 124 which latter pushes the blank between the burring-rollers whereby the ends of the blank are operated upon. As soon as this operation has been completed and the cutter-slide has been retracted, the injector-rod 123 again advances, forcing the burred blank from between the burring-rollers and into the chuck which has arrived at that point. The carrier is then rotated finally to bring the blank into position opposite station II at which point the shank is operated upon by the first set of swaging-dies to form the same into elliptical cross section, as shown at A in Fig. 11, the carrier during this operation moving slightly rearward in correspondence to the section of the swaging-devices. The blank is now clear so that the carrier can again be rotated to bring the blank into alinement with the swaging-devices located at station III, while at the same time it has been turned axially for 90 degrees, so that the swaging-devices at this station will compress the shank at points disposed at right angles to that of the first set. The blank is then transferred to station IV where the blank is again swaged into elliptical form, but smaller than at station II. By the next movement of the carrier the blank is carried to station V where the elliptical shank will be again reduced into a round form similar as at station III, but having a smaller diameter, and finally the blank is transferred to station VI where the finishing dies complete the blank, at which time the formerly rounded shank-end has become practically square-faced at its end by virtue of the stretching or lengthening process which the outer surface of the shank has undergone. The next partial rotation of the carrier will bring the blank from station VI to station VII at which point the stationary ejector abutment 184 is disposed, so that when the carrier in its entirety is drawn rearward by the shifter-cam 193, the finished blank will be pushed out of its chuck whence it will fall onto the inclined surface of the bed 25 at that point, and from there drop to the floor or into suitable box provided for that purpose.

The above explains the operation as far as one blank is concerned, and it will, of course, be understood, that each other chuck of the series will receive a blank and subject it to the same identical operations as the one described.

Many changes may be made in the construction and organization of the several component elements of the machine, without departing from the spirit of the invention, and I wish it distinctly understood that I do not confine myself, except so far as required by the scope of the claims, to the employment of the specific operating means for the several devices, the operation of which may be effected in many different ways.

I claim:

1. The combination with a blank-reducing mechanism comprising a series of swaging-devices, of a carrier consisting of a spider, and an annulus and spacers between said spider and annulus, a series of chucks journaled in said spider and annulus, and means for rotating said carrier.

2. The combination with a blank-reducing mechanism comprising a series of swaging-devices, of a carrier comprising a spider, an annulus and spacers between said spider and annulus, a series of chucks journaled in said spider and annulus, and means for shifting the carrier longitudinally.

3. The combination with a blank-reducing mechanism comprising a series of swaging-devices, of a carrier comprising a spider, an annulus and spacers between said spider and annulus, a series of chucks journaled in said spider and annulus, and means for shifting the carrier longitudinally of its rotation axis.

4. The combination with a blank-reducing mechanism comprising a series of swaging-devices, of a carrier, a series of chucks held on the carrier, gage-rods in said chucks, adjustable bushings in the annulus for positioning said gage-rods, and means for rotating the carrier.

5. The combination with a blank-reducing mechanism comprising a series of swaging-devices, of a carrier, a shaft for rotatably supporting the same, a crank-shaft for intermittently rotating the carrier-shaft, and means for connecting the carrier-shaft and crank-shaft for longitudinal movement.

6. The combination with a blank reducing mechanism comprising a series of swaging-devices, of a carrier, a series of chucks held in the carrier, an annulus on the carrier, gage rods in said chucks, adjustable bushings in the annulus for positioning said gage rods, and means for rotating the carrier.

7. The combination with a blank reducing mechanism comprising a series of swaging devices, of a carrier, a series of chucks held in the carrier, gage rods on said chucks, adjustable bushings for positioning the gage rods, and means for rotating the carrier.

8. The combination with a blank reducing mechanism, comprising a series of swaging devices, of a carrier, a series of chucks held in the carrier, an annulus on the carrier, gage rods in said chucks, adjustable bushings in the annulus for positioning said gage rods and means for shifting the carrier longitudinally.

9. The combination with a blank reducing mechanism comprising a series of swaging devices, of a carrier, a series of chucks held in the carrier, an annulus on the carrier, gage rods in said chucks, adjustable bushings in the annulus for positioning said gage rods and means for shifting the carrier longitudinally of its rotational axis.

10. The combination with a blank reducing mechanism comprising a series of swaging devices, of a carrier, a series of chucks held in the carrier, an annulus on the carrier, gage rods in said chucks, adjustable bushings in the annulus for positioning said gage rods and means for shifting the carrier longitudinally of its rotational axis, and means for rotating the carrier.

Signed by me at Springfield, Mass., in presence of two subscribing witnesses.

GEO. T. WARWICK.

Witnesses:
WM. S. BELLOWS,
G. R. DRISCOLL.

Copies of this patent may be obtained for five cents each, by addressing the "Commissioner of Patents. Washington, D. C."